US010172116B2

(12) United States Patent
Morris

(10) Patent No.: US 10,172,116 B2
(45) Date of Patent: *Jan. 1, 2019

(54) MESSAGING ABSTRACTION IN A MOBILE DEVICE SERVER

(71) Applicant: AT&T INTELLECTUAL PROPERTY I, LP, Atlanta, GA (US)

(72) Inventor: Nadia Morris, Sunnyvale, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/172,213

(22) Filed: Jun. 3, 2016

(65) Prior Publication Data
US 2016/0286531 A1    Sep. 29, 2016

Related U.S. Application Data

(63) Continuation of application No. 12/914,980, filed on Oct. 28, 2010, now Pat. No. 9,392,316.

(51) Int. Cl.
*G06F 15/16* (2006.01)
*H04W 72/04* (2009.01)
(Continued)

(52) U.S. Cl.
CPC ........ *H04W 72/04* (2013.01); *H04N 21/4126* (2013.01); *H04N 21/4367* (2013.01);
(Continued)

(58) Field of Classification Search
CPC .......................... H04W 72/04; H04N 21/4126
(Continued)

(56) References Cited

U.S. PATENT DOCUMENTS

| 5,025,370 A | 6/1991 | Koegel et al. |
| 5,168,568 A | 12/1992 | Thayer et al. |

(Continued)

OTHER PUBLICATIONS

B. Zimmerly, ""A Tiny Cloud in Android—Exploring the Android File System from Your Browser",", pp. 1-17, http://www.ibm.com/developeworks/opensource/library/os-tinycloud/index.htm, website last visited Oct. 1, 2010.

(Continued)

*Primary Examiner* — Suraj M Joshi
*Assistant Examiner* — Joel Mesa
(74) *Attorney, Agent, or Firm* — Guntin & Gust, PLC; Jay H. Anderson

(57) ABSTRACT

A system that incorporates teachings of the present disclosure may include, for example, a mobile device server that receives a pairing key, establishes communication with a media resource center using a web server application of the mobile device server, transmits the pairing key to the media resource center to enable processing of a software application by the mobile device server, detects a request from the software application to utilize a resource of the media resource center, accesses a messaging abstraction library, retrieves a first message from the messaging abstraction library that is representative of the request and that conforms to a first communication protocol of the resource, and transmits the first message to the resource to cause the resource to process the request generated by the software application. Other embodiments are disclosed.

20 Claims, 10 Drawing Sheets

(51) Int. Cl.
*H04N 21/41* (2011.01)
*H04N 21/436* (2011.01)
*H04N 21/4367* (2011.01)
*H04N 21/643* (2011.01)
*H04W 12/06* (2009.01)

(52) U.S. Cl.
CPC ..... *H04N 21/43615* (2013.01); *H04N 21/643* (2013.01); *H04W 12/06* (2013.01)

(58) Field of Classification Search
USPC .................................................. 709/219, 217
See application file for complete search history.

(56) References Cited

U.S. PATENT DOCUMENTS

| | | |
|---|---|---|
| 5,237,567 A | 8/1993 | Nay et al. |
| 5,339,442 A | 8/1994 | Lippincott |
| 5,564,025 A | 10/1996 | De Freese et al. |
| 5,689,559 A | 11/1997 | Park |
| 5,761,421 A | 6/1998 | Van Hoff |
| 6,006,303 A | 12/1999 | Barnaby et al. |
| 6,167,513 A | 12/2000 | Inoue et al. |
| 6,463,153 B1 | 10/2002 | Sako et al. |
| 6,473,401 B1 | 10/2002 | Kong et al. |
| 6,609,115 B1 | 8/2003 | Mehring et al. |
| 6,657,538 B1 | 12/2003 | Ritter |
| 6,938,156 B2 | 8/2005 | Wheeler et al. |
| 7,016,951 B1 | 3/2006 | Longworth et al. |
| 7,127,619 B2 | 10/2006 | Unger et al. |
| 7,194,438 B2 | 3/2007 | Sovio et al. |
| 7,260,597 B1 | 8/2007 | Hofrichter et al. |
| 7,391,866 B2 | 6/2008 | Fukami et al. |
| 7,412,727 B2 | 8/2008 | Kim |
| 7,430,753 B2 | 9/2008 | Gray |
| 7,492,899 B2 | 2/2009 | Qiao |
| 7,546,354 B1 | 6/2009 | Fan et al. |
| 7,590,703 B2 | 9/2009 | Cashman et al. |
| 7,634,076 B2 | 12/2009 | Lee et al. |
| 7,720,986 B2 | 5/2010 | Savoor |
| 7,756,130 B1 | 7/2010 | Lee |
| 7,761,531 B2 | 7/2010 | Johnson et al. |
| 8,005,476 B2 | 8/2011 | Karaoguz et al. |
| 8,015,253 B1 | 9/2011 | Zapata et al. |
| 8,108,359 B1 | 1/2012 | Cooley et al. |
| 8,108,916 B2 | 1/2012 | Fink et al. |
| 8,116,808 B2 | 2/2012 | Amine |
| 8,130,738 B2 | 3/2012 | Chan et al. |
| 8,169,958 B2 | 5/2012 | Torres et al. |
| 8,332,905 B2 | 12/2012 | Jenkin et al. |
| 8,392,947 B2 | 3/2013 | Grannan et al. |
| 8,396,475 B1 | 3/2013 | Bonner |
| 8,443,420 B2 | 5/2013 | Brown et al. |
| 8,516,039 B2 | 8/2013 | Brown et al. |
| 8,989,055 B2 | 3/2015 | Simpson et al. |
| 9,066,123 B2 | 6/2015 | Christopher |
| 9,338,169 B2 | 5/2016 | Brown et al. |
| 9,544,627 B2 | 1/2017 | Christopher |
| 9,654,366 B2 | 5/2017 | Brown et al. |
| 9,924,362 B2 | 3/2018 | Karaoguz et al. |
| 9,942,588 B2 | 4/2018 | Christopher et al. |
| 2002/0033416 A1 | 3/2002 | Gerszberg et al. |
| 2002/0078130 A1 | 6/2002 | Thornton et al. |
| 2002/0143773 A1 | 10/2002 | Spicer et al. |
| 2002/0157002 A1 | 10/2002 | Messerges et al. |
| 2002/0180581 A1 | 12/2002 | Kamiwada et al. |
| 2002/0184301 A1 | 12/2002 | Parent |
| 2003/0026423 A1 | 2/2003 | Unger et al. |
| 2003/0051041 A1 | 3/2003 | Kalavade et al. |
| 2003/0095664 A1 | 5/2003 | Asano et al. |
| 2003/0190024 A1 | 10/2003 | Ju |
| 2004/0133794 A1 | 7/2004 | Kocher et al. |
| 2004/0185876 A1 | 9/2004 | Groenendaal et al. |
| 2004/0215746 A1 | 10/2004 | McCanne et al. |
| 2004/0240668 A1 | 12/2004 | Bonan et al. |
| 2004/0253923 A1 | 12/2004 | Braley et al. |
| 2005/0010637 A1 | 1/2005 | Dempski et al. |
| 2005/0044223 A1 | 2/2005 | Meyerson |
| 2005/0125819 A1 | 6/2005 | Ono et al. |
| 2005/0138192 A1 | 6/2005 | Encarnacion et al. |
| 2005/0147126 A1 | 7/2005 | Qiu et al. |
| 2005/0177515 A1 | 8/2005 | Kalavade et al. |
| 2005/0216300 A1 | 9/2005 | Appelman et al. |
| 2005/0235329 A1 | 10/2005 | Karaoguz et al. |
| 2005/0251821 A1 | 11/2005 | Pina et al. |
| 2006/0009247 A1 | 1/2006 | Kelley et al. |
| 2006/0031451 A1 | 2/2006 | Lortz et al. |
| 2006/0046714 A1 | 3/2006 | Kalavade |
| 2006/0098593 A1 | 5/2006 | Edvardsen et al. |
| 2006/0123099 A1 | 6/2006 | Paila |
| 2006/0150251 A1 | 7/2006 | Takashima et al. |
| 2006/0172700 A1 | 8/2006 | Wu |
| 2006/0193456 A1 | 8/2006 | Light et al. |
| 2006/0209773 A1 | 9/2006 | Hundal |
| 2006/0220838 A1 | 10/2006 | Wakim et al. |
| 2006/0262913 A1 | 11/2006 | Cook et al. |
| 2006/0271968 A1 | 11/2006 | Zellner |
| 2007/0005506 A1 | 1/2007 | Candelore et al. |
| 2007/0019670 A1* | 1/2007 | Falardeau ............. H04W 48/18 370/465 |
| 2007/0022469 A1 | 1/2007 | Cooper |
| 2007/0055783 A1 | 3/2007 | Gourraud |
| 2007/0097860 A1 | 5/2007 | Rys et al. |
| 2007/0130476 A1 | 6/2007 | Mohanty et al. |
| 2007/0140448 A1 | 6/2007 | Lin et al. |
| 2007/0142036 A1 | 6/2007 | Wikman et al. |
| 2007/0157281 A1 | 7/2007 | Ellis |
| 2007/0180082 A1 | 8/2007 | Abraham et al. |
| 2007/0180111 A1 | 8/2007 | Chmaytelli et al. |
| 2007/0263853 A1 | 11/2007 | Pearson et al. |
| 2007/0298842 A1 | 12/2007 | Kamada et al. |
| 2008/0009265 A1 | 1/2008 | Fernandez-Alonso et al. |
| 2008/0074258 A1 | 3/2008 | Bennett et al. |
| 2008/0134295 A1 | 6/2008 | Bailey et al. |
| 2008/0195406 A1 | 8/2008 | Matsumoto |
| 2008/0230534 A1 | 9/2008 | Winkler et al. |
| 2008/0235770 A1 | 9/2008 | Miao |
| 2008/0281926 A1 | 11/2008 | Walter et al. |
| 2009/0019492 A1 | 1/2009 | Grasset |
| 2009/0031360 A1 | 1/2009 | Kidd et al. |
| 2009/0063193 A1 | 3/2009 | Barton et al. |
| 2009/0088197 A1 | 4/2009 | Stewart |
| 2009/0089183 A1 | 4/2009 | Afram et al. |
| 2009/0093237 A1 | 4/2009 | Levenshteyn et al. |
| 2009/0106366 A1 | 4/2009 | Virtanen et al. |
| 2009/0171985 A1 | 7/2009 | Tischer |
| 2009/0193486 A1 | 7/2009 | Patel et al. |
| 2009/0204617 A1 | 8/2009 | Benson et al. |
| 2009/0282098 A1 | 11/2009 | Karaoguz |
| 2009/0288122 A1 | 11/2009 | Zellner |
| 2009/0298514 A1 | 12/2009 | Ullah et al. |
| 2009/0298535 A1 | 12/2009 | Klein et al. |
| 2009/0327702 A1 | 12/2009 | Schnell |
| 2009/0328118 A1 | 12/2009 | Ravishankar |
| 2009/0328228 A1 | 12/2009 | Schnell |
| 2010/0023952 A1 | 1/2010 | Sandoval et al. |
| 2010/0031298 A1 | 2/2010 | Iwanami et al. |
| 2010/0031366 A1 | 2/2010 | Knight et al. |
| 2010/0052853 A1 | 3/2010 | Hilton |
| 2010/0058398 A1 | 3/2010 | Ojala et al. |
| 2010/0071021 A1 | 3/2010 | Friedman |
| 2010/0076274 A1 | 3/2010 | Severson |
| 2010/0125907 A1 | 5/2010 | Jonsson |
| 2010/0131393 A1 | 5/2010 | Pattabiraman et al. |
| 2010/0154021 A1 | 6/2010 | Howarter et al. |
| 2010/0194335 A1 | 8/2010 | Kirby et al. |
| 2010/0197238 A1 | 8/2010 | Pathuri et al. |
| 2010/0262467 A1 | 10/2010 | Barnhill, Jr. et al. |
| 2010/0275249 A1 | 10/2010 | McCann et al. |
| 2010/0328547 A1 | 12/2010 | Mayorga |
| 2011/0022522 A1 | 1/2011 | Sege |
| 2011/0043326 A1 | 2/2011 | Lee et al. |
| 2011/0055901 A1 | 3/2011 | Karaoguz et al. |
| 2011/0130118 A1 | 6/2011 | Fan |

(56) References Cited

U.S. PATENT DOCUMENTS

| | | | |
|---|---|---|---|
| 2011/0131398 | A1 | 6/2011 | Chaturvedi et al. |
| 2011/0197264 | A1 | 8/2011 | McDade |
| 2011/0209221 | A1 | 8/2011 | Hanson et al. |
| 2011/0225417 | A1* | 9/2011 | Maharajh ............ G06F 21/10 713/150 |
| 2011/0258437 | A1 | 10/2011 | McKelvey |
| 2012/0002567 | A1 | 1/2012 | Sun et al. |
| 2012/0030034 | A1 | 2/2012 | Knapp et al. |
| 2012/0036549 | A1 | 2/2012 | Patel et al. |
| 2012/0062796 | A1 | 3/2012 | Roberts et al. |
| 2012/0079507 | A1 | 3/2012 | Agarwal et al. |
| 2012/0079570 | A1 | 3/2012 | Fu et al. |
| 2012/0081209 | A1 | 4/2012 | Brown et al. |
| 2012/0084186 | A1 | 4/2012 | Brown et al. |
| 2012/0084342 | A1 | 4/2012 | Brown et al. |
| 2012/0084834 | A1 | 4/2012 | Brown et al. |
| 2012/0246214 | A1 | 9/2012 | Ogawa et al. |
| 2013/0003743 | A1 | 1/2013 | Palmer et al. |
| 2013/0031261 | A1 | 1/2013 | Suggs et al. |
| 2013/0254353 | A1 | 9/2013 | Liu et al. |
| 2014/0298418 | A9 | 10/2014 | Cronk et al. |
| 2016/0212739 | A1 | 7/2016 | Brown et al. |
| 2016/0255413 | A1 | 9/2016 | Brown et al. |
| 2017/0054700 | A1 | 2/2017 | Brown |
| 2017/0078728 | A1 | 3/2017 | Christopher et al. |
| 2017/0195885 | A1 | 7/2017 | Brown et al. |
| 2017/0223396 | A1 | 8/2017 | Brown et al. |
| 2017/0295282 | A1 | 10/2017 | Delorme et al. |
| 2018/0184147 | A1 | 6/2018 | Christopher et al. |

OTHER PUBLICATIONS

Davies, C., ""i-Jetty Turns Android Cellphone Into Mobile Webserver",", pp. 1-6, http://www.phonemag.com/i-jetty-turnsandroid-cellphone-into-mobile-webserver-031762 . . . , posted Mar. 17, 2008, website last visited Oct. 1, 2010.

Davies, C., "i-Jetty Turns Android Cellphone Into Mobile Webserver", 6 pages, http://www.phonemag.com/i-jetty-turns-android-cellphone-into-mobile-webserver-031762 . . . , posted Mar. 17, 2008, website last visited Oct. 1, 2010.

Lin, et al., ""On Controlling Digital TV Set-Top-Box by Mobile Devices via IP Network",", pp. 1-8, Proceedings of the Seventh IEEE International Symposium on Multimedia (ISM '05), Computer Society, 2005.

Lin, et al., "On Controlling Digital TV Set-Top-Box by Mobile Devices via IP Network", 8 pages, Proceedings of the Seventh IEEE International Symposium on Multimedia (ISM '05), Computer Society, 2005.

Linux, Devices , ""iNTEL 'Personal Server' Research: Mobile Computing in the Palm of your Hand",", pp. 1-4, http://www.linuxfordevices.com/c/a/Linux-For-Devices-Articles/Intel-Personal-Server-res . . . , website last visited Oct. 1, 2010.

Opensource, ""MWS:Rationale—A Website on a Mobile Personal Device is Different",", pp. 1-4, http://wiki.opensource.nokia.com/projects/MWS:Rationale, website last visited Oct. 1, 2010.

Rendon, et al., "Architecture for Web Services Access from Mobile Devices", Web Congress, LA-WEB 2005, Third Latin American, 2005.

Soroko, "Web Server on Your Cellphone—A New Design Space", Popular Logistics, Feb. 16, 2010, 4 pages.

Soroko, Jonathan , "Web Server on Your Cellphone—a New Design Space", pp. 1-4, Popular Logistics, Feb. 16, 2010.

Toorani, et al., ""LPKI—A Lightweight Public Key Infrastructure for the Mobile Environments"", pp. 162-166, IEEE 2008, ICCS 2008.

Wikipedia, ""Mobile Web Server (Symbian OS)",", 1 page, http://en.wikipedia.org/wiki/Mobile_Web_Server_(Symbian_OS), website last visited Oct. 1, 2010.

Wikipedia, ""Mobile Web Server",", pp. 1-3, Page last modified Sep. 11, 2010.

Wikipedia, "Mobile Web Server", pp. 1-3, website last visited Oct. 1, 2010.

Zimmerly, Bill , "A Tiny Cloud in Android", 17 pages article, website last visited Oct. 1, 2010, http://www.ibm.com/developerworks/opensources/library/os-tinycloud/index.html.

* cited by examiner

900

MESSAGING ABSTRACTION IN A MOBILE DEVICE SERVER

CROSS-REFERENCE TO RELATED APPLICATIONS

This application is a Continuation of and claims priority to U.S. patent application Ser. No. 12/914,980 filed Oct. 28, 2010. The contents of the foregoing is hereby incorporated by reference into this application as if set forth herein in full.

FIELD OF THE DISCLOSURE

The present disclosure relates generally to device communication and messaging abstraction.

BACKGROUND

Media communication systems such as interactive television systems can deliver media content to media processors such as set-top boxes. Media content can be broadcast by these systems and delivered according to the type of services that users have subscribed to. In interactive media communication systems, users can also request services on demand. Portable media devices can be adapted to communicate with media processors over a wireless medium. The combined services of portable and fixed media devices can provide users with a rich environment for utilizing multimedia services.

DETAILED DESCRIPTION

Figure 1:
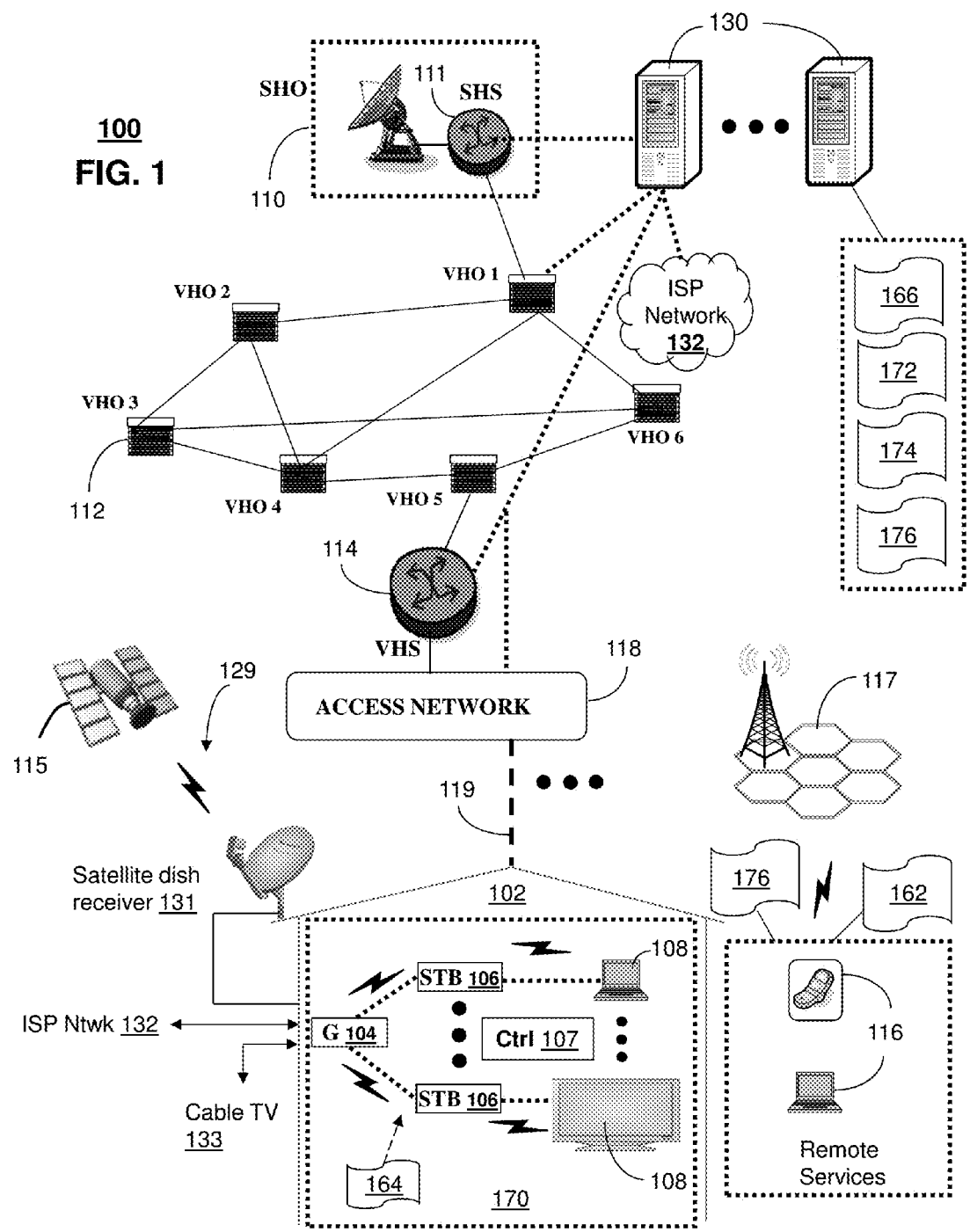
FIGS. 1-2 depict illustrative embodiments of communication systems that provide media services.

The present disclosure describes, among other things, illustrative embodiments of a mobile device server for establishing communications and exchanging messages with a media resource center that manages resources capable of supplying media content of various forms to the mobile device server. The mobile device server can include a web server application operating therein to enable utilization of media resources of the media resource center. To facilitate interoperability between software applications being executed by the mobile device server and the media resources, a messaging abstraction library can be provided. The messaging abstraction library allows for retrieval of messages representing requests by a software application to utilize one or more of the media resources.

The messages of the messaging abstraction library can conform to a communication protocol of the resource and can be transmitted to the resource by the mobile device server so that the resource receives a device specific message. In one embodiment, updates to the messaging abstraction library can be performed without updating or otherwise modifying the software application of the mobile device server. The messaging abstraction library can also be utilized to retrieve messages representing responses from the resource that conform to a communication protocol of the software application. Other embodiments are contemplated by the present disclosure as described below.

One embodiment of the present disclosure can include a portable communication device having a processor adapted to receive a pairing key, access a messaging abstraction library, and execute a web server application in the portable communication device. The web server application is operable to cause the device to detect a media resource center upon entering a communication zone of the media resource center, to establish communication with the media resource center, and to transmit the pairing key to the media resource center to enable utilizing a resource of the media resource center. The web server application is also operable to detect a request from the software application to utilize the resource of the media resource center, to retrieve a first message from the messaging abstraction library that is representative of the request and that conforms to a communication protocol of the resource, and to transmit the first message to the resource to cause the resource to process the request generated by the software application.

Another embodiment includes a method that includes storing a plurality of messages at a remote server, where the plurality of messages is associated with operation of a resource of a media resource center. The method also includes receiving a request from a web server application being executed by a mobile device server where the request is generated by a software application of the mobile device server and is associated with utilizing the resource. The method further includes selecting a first message from the plurality of messages where the first message is representative of the request and conforms to a communication protocol of the resource. The method includes providing the first message to the mobile device server, where the first message causes the resource to process the request generated by the software application when the first message is transmitted by the mobile device server to the resource.

Another embodiment includes a method that includes receiving a pairing key at a mobile device server, establishing communications with a media resource center using a web server application of the mobile device server, and transmitting the pairing key to the media resource center to enable processing of a software application by the mobile device server. The method also includes detecting a request from the software application to utilize a resource of the media resource center and accessing a messaging abstraction library. The method further includes retrieving a first message from the messaging abstraction library that is representative of the request and that conforms to a communication protocol of the resource. The method includes transmitting the first message to the resource to cause the resource to process the request generated by the software application.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 that house a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline, or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can also be used in the media system of FIG. 1. The satellite broadcast television system 129 can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can also be coupled to one or more non-portable computing devices 130, a portion of which can operate as a web server for providing portal services over an Internet Service Provider (ISP) network 132 to wireline media devices 108 or wireless communication devices 116.

Multiple forms of media services can be offered to media devices over landline technologies such as those described above. Additionally, media services can be offered to media devices by way of a wireless access base station 117 operating according to wireless access protocols such as Wireless Fidelity (WiFi), or cellular communication technologies such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on). Other present and next generation wide area wireless network technologies are contemplated by the present disclosure.

The communication system 100 can also provide for all or a portion of the computing devices 130 to function as a remote server (herein referred to as server 130). The server 130 can use computing and software technology 166 to process requests initiated by a web server application 162 operating in portable communication devices, such as those shown in reference 108 or 116 (herein referred to as mobile device servers). Server 130 can also be used to control operations of a resource control manager 164 which can operate from the residential gateway 104, the media processor 106 or other computing devices in building 102 for managing resources of a media resource center 170. Another aspect of the server 130 can be a content provider system 172 which can be used for distributing media content to the communication devices of FIG. 1.

It is further contemplated by the present disclosure that the server 130 can also represent a billing system 174 for billing a subscriber account when applications are requested by the mobile device servers and/or for billing the subscriber account when resources of the media resource center 170 are requested by mobile device servers. The content provider system 172 and the billing system 174 can be managed by a service provider of the media communication system 100 of FIG. 1, or by third party entities.

The communication system 100 can also include a messaging abstraction library 176 that includes a plurality of messages associated with operation of the resources (such as STB 106) of the media resource center 170. The messaging abstraction library 176 can be stored, in whole or in part, by the mobile devices 116 and/or the computing devices 130. The messaging abstraction library 176 allows for retrieval of device specific messages that conform to the communication protocol of the device receiving the message. For instance, a command generated by a software application being executed on the mobile device 116 can be translated via the messaging abstraction library 176 to a device specific command before being received by a resource of the media resource center 170. Similarly, the messaging abstraction library 176 can be utilized to translate responses from the resource to a message that conforms to a communication protocol of the software application being executed on the mobile device 116. In one embodiment, updates to the messaging abstraction library 176 can be performed to allow software applications to be compatible with new or otherwise modified resources without updating the software application on the mobile device 116.

Illustrative embodiments of methods that can operate in portions of the aforementioned devices and systems of FIG. 1 are described below.

Figure 2:
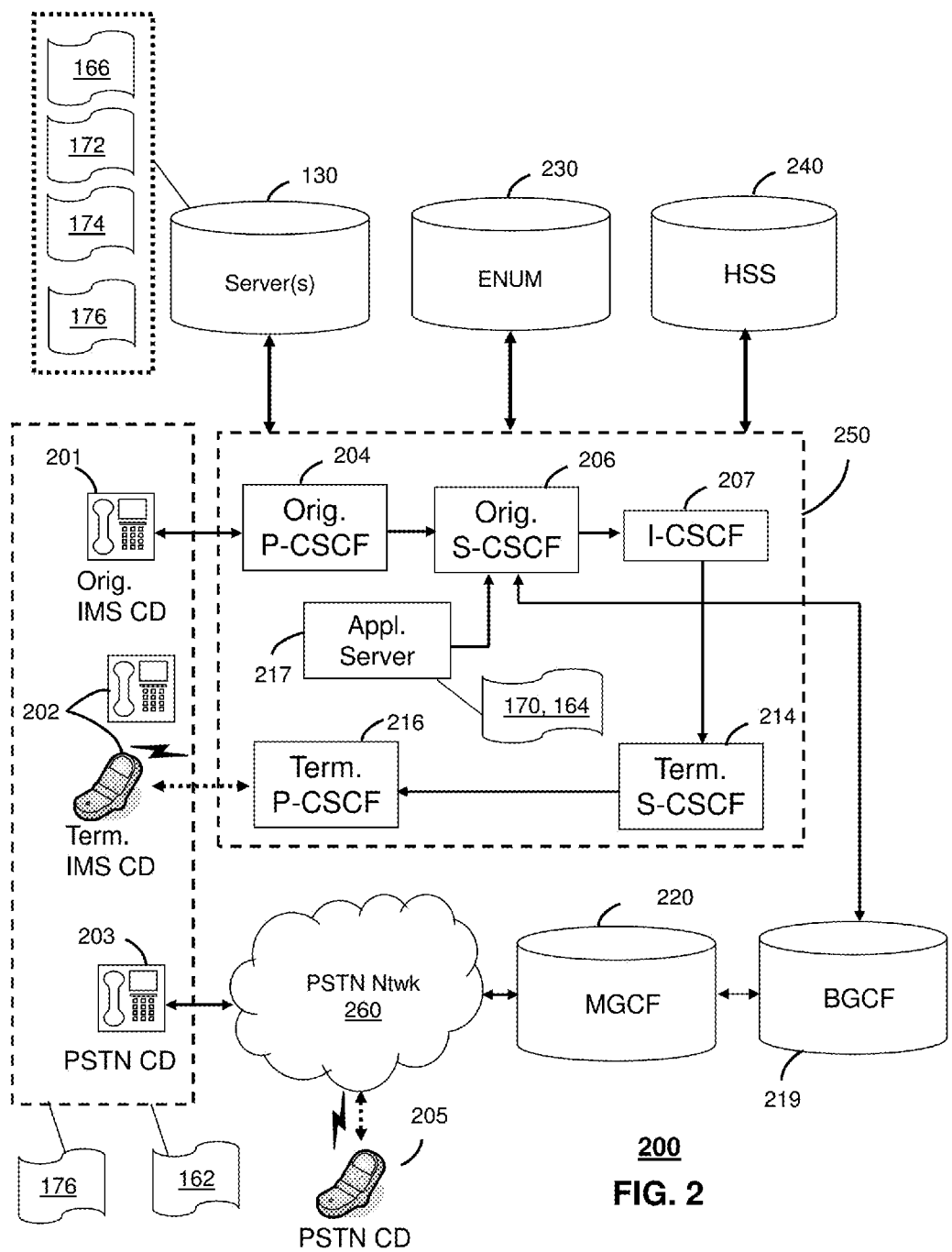

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 may not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with a corresponding Serving CSCF (S-CSCF) to register the IMS CDs 201, 202 with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE message to a SIP Uniform Resource Identifier (URI) if the terminating communication device is IMS compliant. The originating S-CSCF 206 can submit the SIP INVITE message to an application server (AS) such as reference 217 that can provide a variety of services to IMS subscribers. For example, the application server 217 can be used to perform originating treatment functions on the calling party number received by the originating S-CSCF 206 in the SIP INVITE message. Originating treatment functions can include determining whether the calling party number has international calling services, and/or is requesting special telephony features (e.g., *72 forward calls, *73 cancel call forwarding, *67 for caller ID blocking, and so on).

Additionally, the originating S-CSCF 206 can submit queries to the ENUM system 230 to translate an E.164 telephone number in the SIP INVITE message to a SIP Uniform Resource Identifier (URI) if the terminating communication device is IMS compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 then signals the CD 202 to establish Voice over Internet Protocol (VoIP) communication services, thereby enabling the calling and called parties to engage in voice and/or data communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice communications.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 with the multimedia and Internet services of communication system 100.

It is further appreciated that the CDs of FIG. 2 can operate as wireline or wireless devices. Although not shown, the CDs of FIG. 2 can be communicatively coupled to a cellular base station, a femtocell, a WiFi router, a DECT base unit, or another suitable wireless access unit to establish communications with the IMS network 250 of FIG. 2. Accordingly, multiple wireline and wireless communication technologies are contemplated for the CDs of FIG. 2.

System 200 can include or otherwise be coupled with computing devices 130 of FIG. 1 for purposes similar to those described above. Computing devices 130 can function as a remote server 166, content provider system 172, and billing system 174. It is further contemplated by the present disclosure that a web server application 162 can operate from any of the communication devices (e.g., references 201, 202, 203, and 205) depicted in FIG. 2. It is also contemplated that these devices can communicate with a resource control manager 164 operating from, for example, the application server 217, to gain access to resources of the media resource center 170. Illustrative embodiments of methods that can operate in portions of the devices of FIG. 2 are described below. The messaging application library 176 can also be used with system 200 to facilitate communication between the communication devices and the resources.

Figure 3:
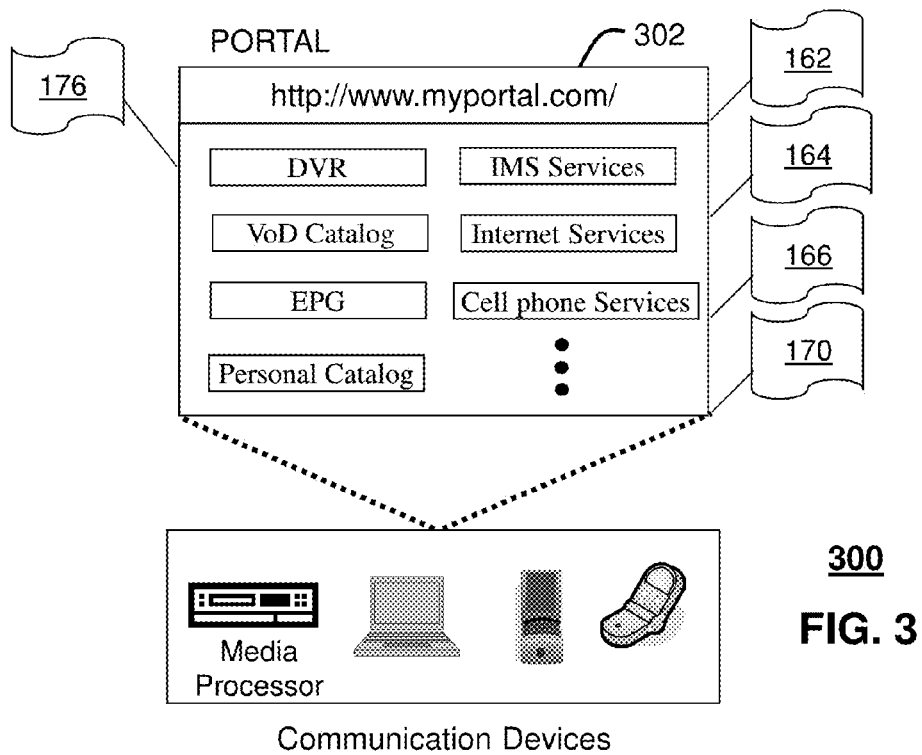
FIG. 3 depicts an illustrative embodiment of a portal that can interact with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with a Internet browser such as Microsoft's Internet Explorer™, Mozilla's Firefox™, Apple's Safari™, or Google's Chrome™ using an Internet-capable communication device such as those described for FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored in the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162, 164, 166, and 170 of a mobile device server, a resource control manager, a remote server, and a media resource center, respectively, as well as the messaging abstraction library 176, as described earlier. Illustrative embodiments of methods that can operate in portions of the web portal 302 of FIG. 3 are described below.

Figure 4:
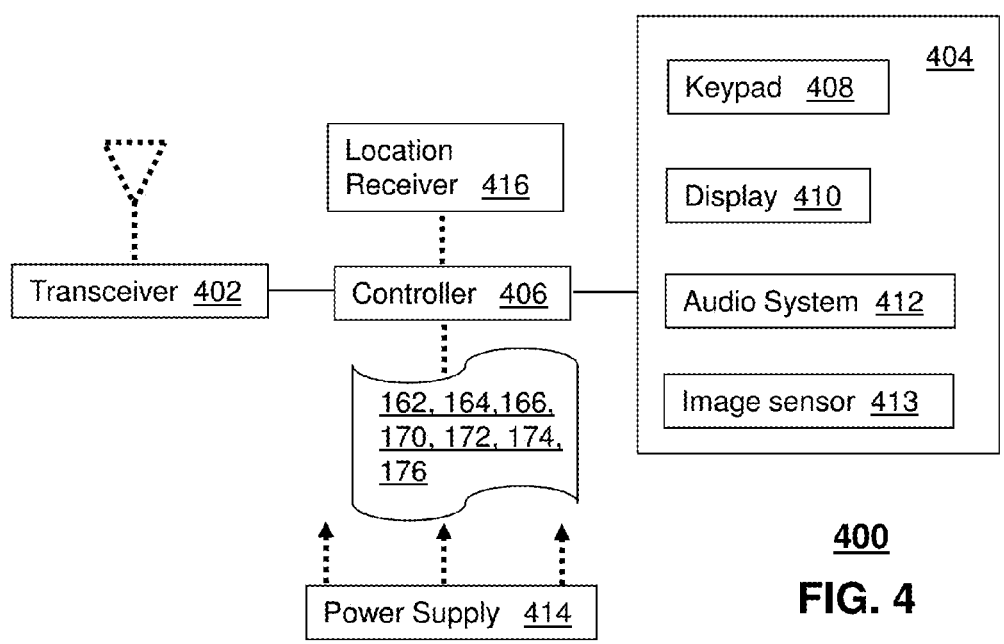
FIG. 4 depicts an illustrative embodiment of a communication device that can be utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying information to an end user of the communication device 400. In an embodiment where the display 410 is touch-sensitive, a portion or all of the keypad 408 can be presented by way of the display 410 with its navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize power management technologies such as replaceable and rechargeable batteries, supply regulation technologies, and charging system technologies for supplying energy to the components of the communication device 400 to facilitate long-range or short-range portable applications. The location receiver 416 can utilize location technology such as a global positioning system (GPS) receiver capable of assisted GPS for identifying a location of the communication device 400 based on signals generated by a constellation of GPS satellites, thereby facilitating location services such as navigation.

The communication device 400 can use the transceiver 402 to also determine a proximity to a cellular, WiFi, Bluetooth or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is further contemplated by the present disclosure that the communication device 400 can operate as a media resource center, a resource control manager, a mobile device server, a remote server, a content provider system, or a billing system as described earlier. The controller 406 can be adapted in various embodiments to perform the functions 162, 164, 166, 170, 172, 174, and 176 of the mobile device server, resource control manager, remote server, media resource center, content provider system, billing system and messaging abstraction library, respectively. Illustrative embodiments of methods that can operate in portions of the communication device 400 of FIG. 4 are described below.

Figure 5:
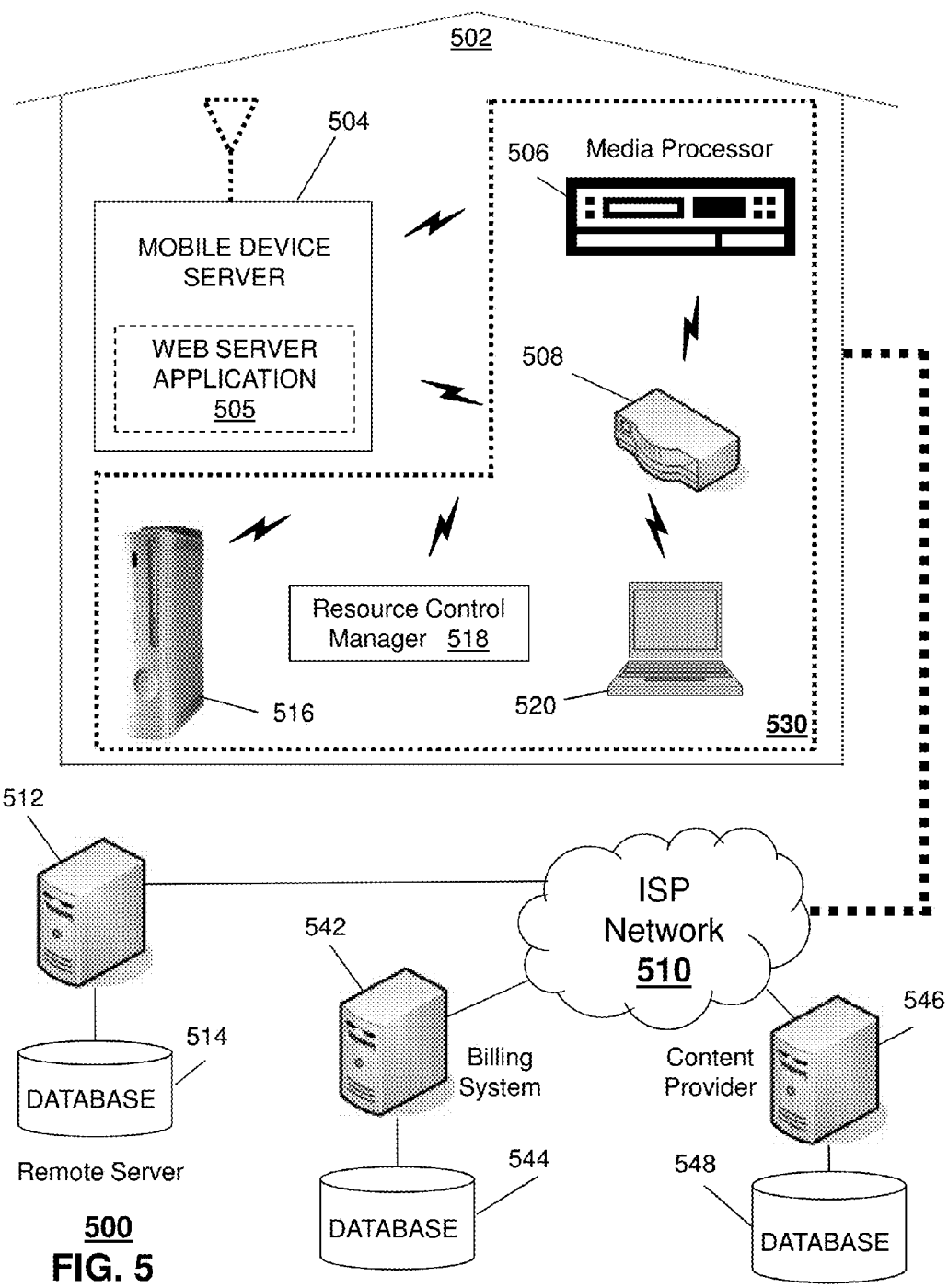
FIG. 5 depicts an illustrative embodiment of a system with computing and media resources.
Figure 6:
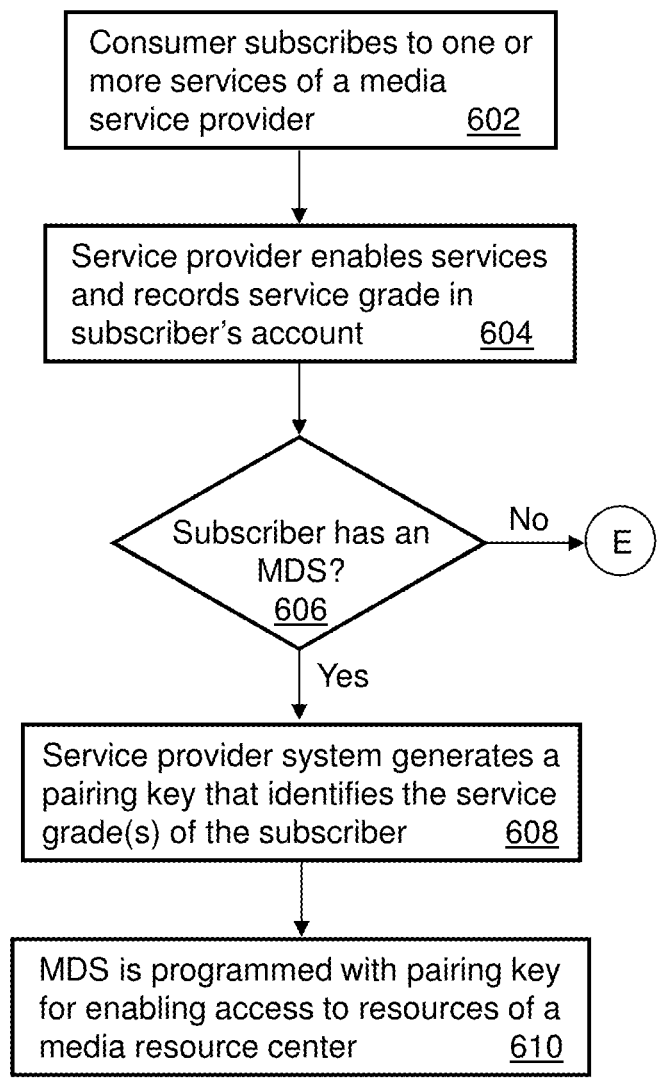
FIGS. 6-10 depict illustrative embodiments of methods operating in portions of the systems and components of FIGS. 1-5.
Figure 7:
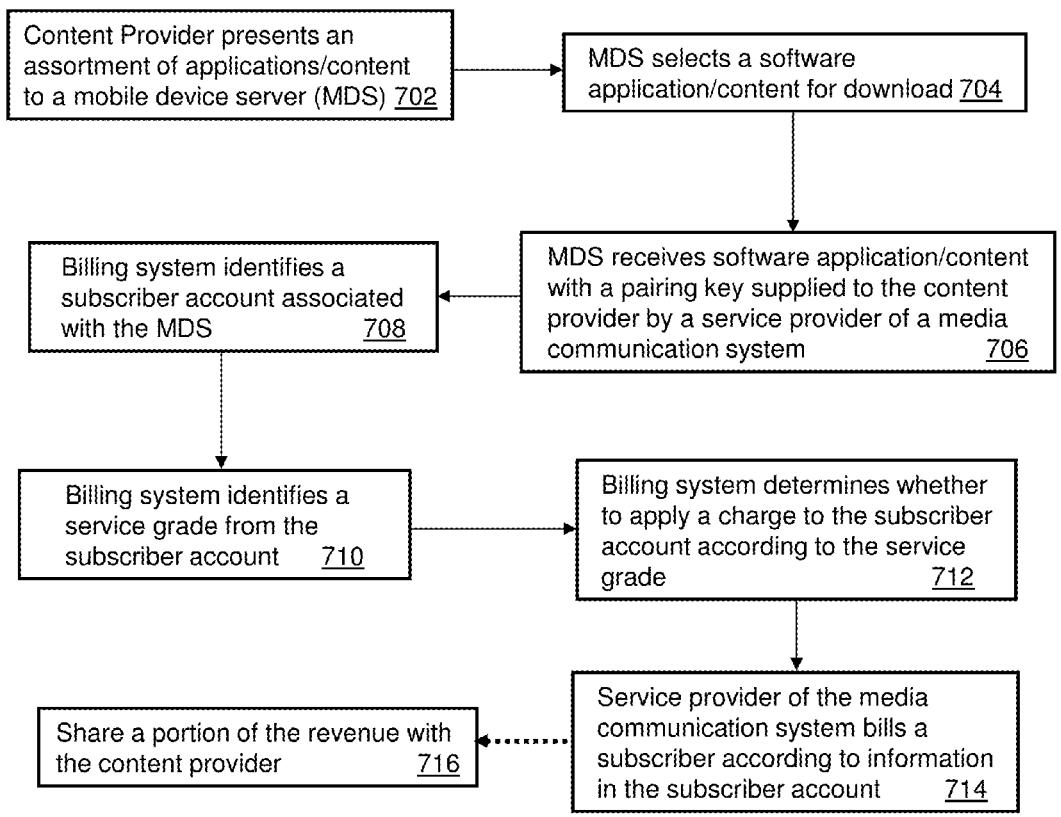
Figure 8:
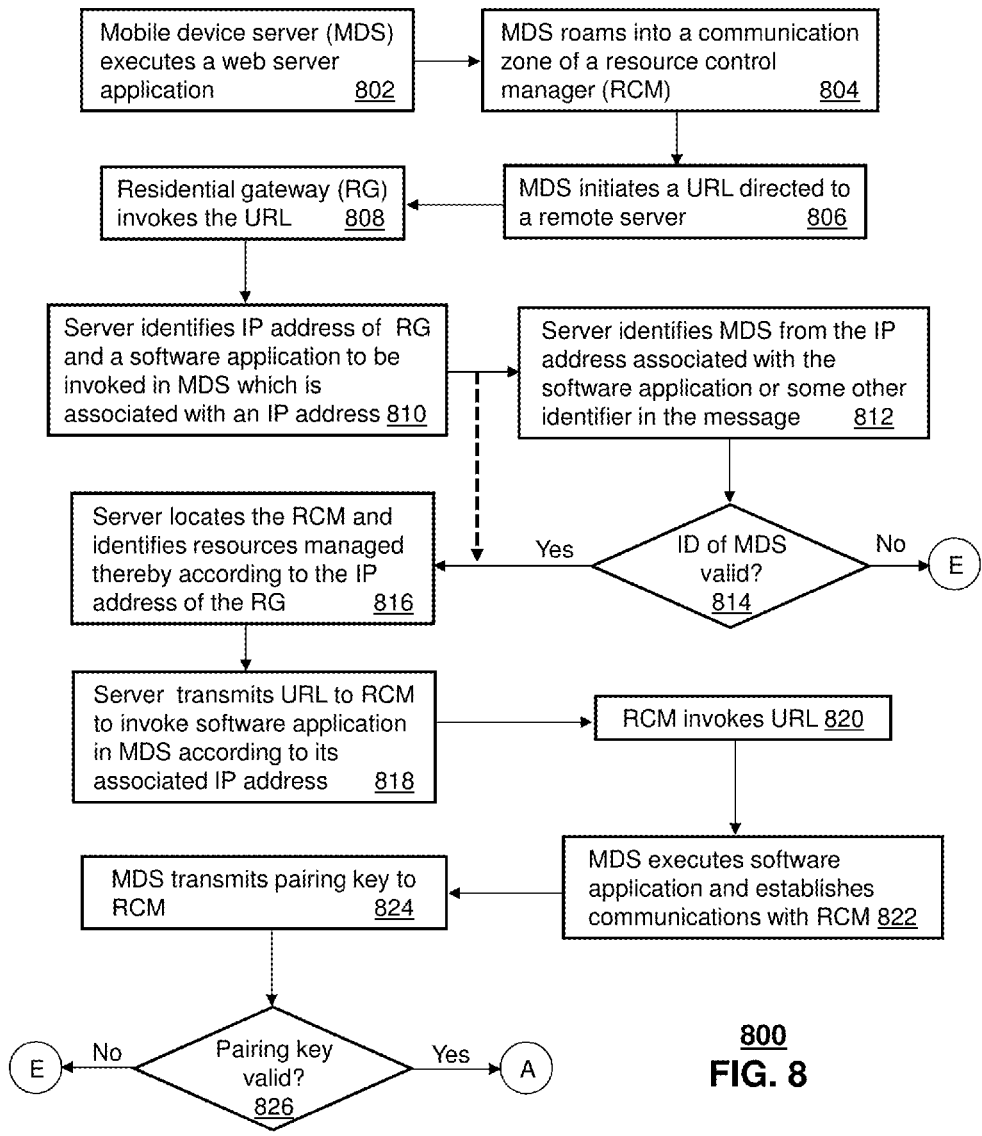
Figure 9:
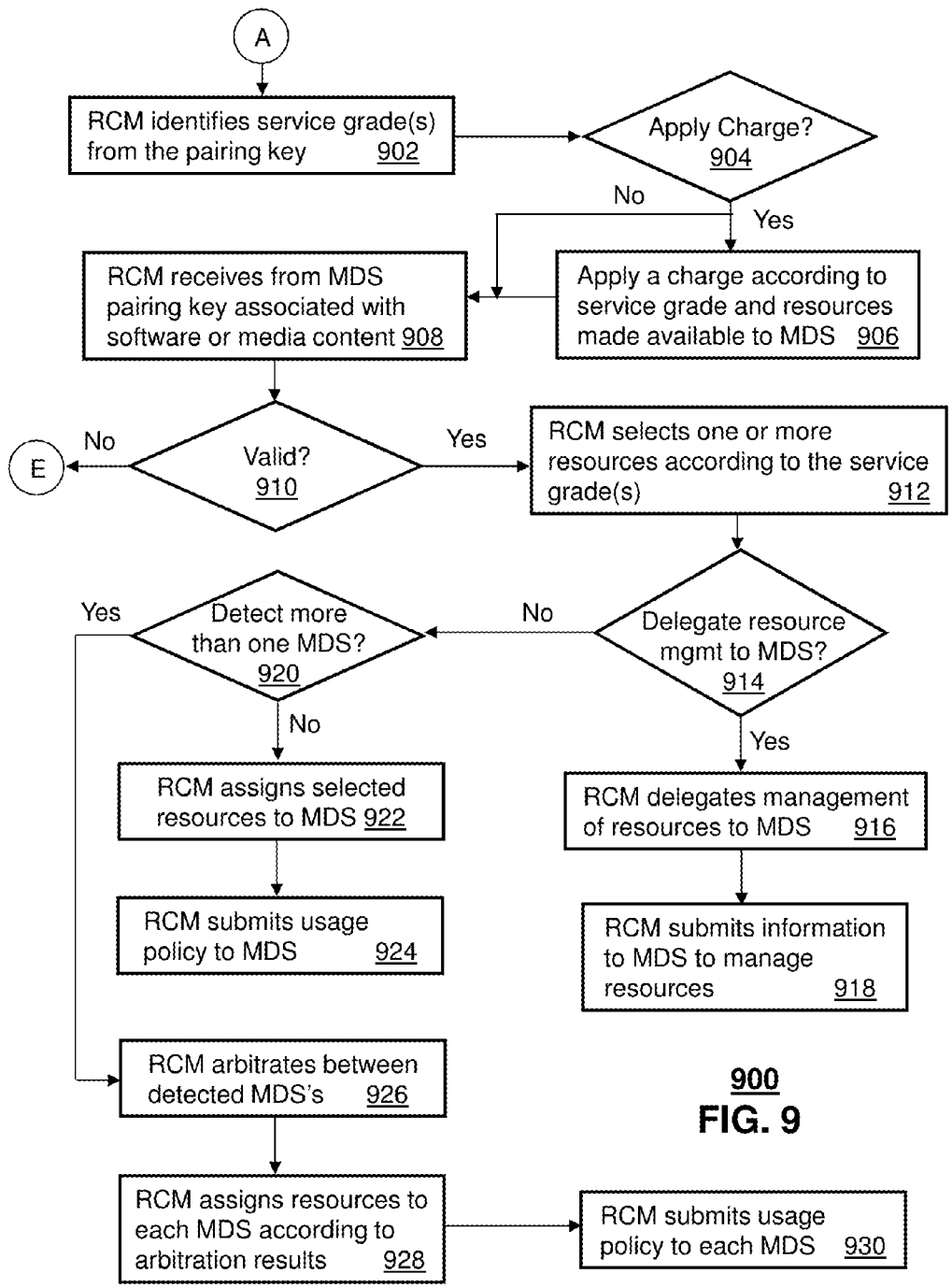

FIG. 5 depicts an illustrative embodiment of a system 500 that can operate according to methods 600-900 described in FIGS. 6-9. System 500 can comprise a mobile device server 504 that can be located in a building 502 (residence or commercial establishment), such as when a user enters the building. The mobile device server 504 can represent a portable telephone such as a cellular telephone, a cordless telephone, a portable computer, or a portable gaming device comprising in whole or in part the components of the communication device 400 shown in FIG. 4. The mobile device server 504 can be a portable telephony device which is capable of executing a web server application 505. Other embodiments of the mobile device server 504 such as a Personal Digital Assistant (PDA), a smart phone, or a tablet (e.g., an iPAD™) adapted to execute a web server application 505 are contemplated by the present disclosure. For illustration purposes, the present disclosure will make references to the components shown in FIG. 4 when discussing the operations of the mobile device server 504.

The web server application 505 can represent a hypertext transfer protocol (HTTP) web server application implemented in software, hardware or combinations thereof operating from the controller 406 of the mobile device server 504. The web server application 505 can also be represented by a web server application used by a server or hosting computer system. Accordingly, multiple types of web server applications 505 operational in the mobile device server 504 are contemplated by the present disclosure.

System 500 can further include a media processor 506 and a gateway 508 that can provide wireless communication services to the media processor 506 and other devices in the building 502 such as a computing device 520, a gaming console 516, and a resource control manager 518. The resources in building 502 can collectively represent a media resource center 530. The resource control manager 518 can be a standalone computing device as shown in FIG. 5. In another embodiment, the resource control manager 518 can be included in, or otherwise be an integral part of, the gateway 508. In yet another illustrative embodiment, the functions of the resource control manager 518 can be distributed among several devices such as the gateway 508 and computing device 520. The resource control manager 518 can be utilized to manage usage of media and computing resources of the media resource center 530 by the mobile device server 504.

System 500 can also comprise an Internet Service Provider (ISP) network 510 that provides private and/or public Internet services to building 502. By way of the ISP network 510, the resource control manager 518 can communicate with a remote server 512 for purposes of managing resources made available to the mobile device server 504 as will be described below. A database 514 can be communicatively coupled to the remote server 512 to provide resource management services to one or more resource control managers 518 operating from a plurality buildings (only building 502 is shown in FIG. 5). The resource control manager 518 can be operable to access, by way of the ISP network 510, a billing system 542 communicatively coupled to a database 544. The billing system 542 can be utilized for applying charges to a subscriber account associated with the mobile device server 504. The billing system 542 can be managed by a service provider of the media communication systems 100-300 of FIGS. 1-3, or a third party having a commercial arrangement with the service provider of systems 100-300.

The mobile device server 504 can also be operable to access the ISP network 510 by way of gateway 508 or by way of a long-range wireless communication system such as a cellular or WiMAX communication system. The mobile device server 504 is operable to access the content provider system 546 to request content stored in database 548 in the form of software applications and/or media content that can be downloaded to the mobile device server 504 for presentation at the mobile device server 504 or by way of one or more of the media resources of the media resource center 530. When a software application and/or media content is downloaded to the mobile device server 504, a charge can be applied to a subscriber account.

FIGS. 6-9 depict illustrative embodiments of methods 600-900 that can be applied to the operations of portions of the systems and devices of FIGS. 1-5.

Method 600 depicts an illustrative embodiment for subscribing to media services and for programming a mobile device server 504 with an identifier (such as a pairing key described below) that identifies the subscribed services. Method 600 can begin with step 602 in which a consumer subscribes to one or more services of a media service provider. The media service provider can offer consumers interactive media and communication services such as shown in FIGS. 1-2, interactive portal services such as shown in FIG. 3, and combinations thereof. Services offered by the service provider can include without limitation interactive TV (iTV) services, cellular phone services, Internet services, landline voice communication services, portal services, as well as other next generation media services.

A service provider can offer consumers grades of these services, which an agent of the service provider can record in step 604 in a subscriber-created account. For example a service provider can offer a plurality of grades of iTV services (e.g., basic channels, upgrade to sports channels, upgrade to premium movie channels, etc.). The service provider can also offer grades of services for cellular phone services (e.g., nationwide coverage, minute grades, data services, computer tethering services, etc.). Internet services can also be graded by speed, reliability, service and support (business vs. consumer grade), and so on. Landline voice services can also be graded by call plans such as nationwide call plans, local call plans, international call plans, etc. Portal services can also be graded according to the capability of the web portal to access resources of the consumer, the ability to view media content as streamed data, the ability to share media content with friends and family, and so on.

Collectively, all grades of service can be identified by a single grade of service identifier (ID), or as a string of service grade IDs each identifying the grade of service of each service offered to a subscriber. Hence forth, the term service grade can represent a single service grade that collectively describes a family of service grades, or it can represent a sequence of service grades each describing a respective service.

If at step 606, a service provider system (such as one of the computing devices 130 of FIG. 1) detects that the subscriber has a mobile device server 504, or a mobile device server 504 is offered to and accepted by the subscriber, the service provider system can proceed to 608 where it generates a pairing key which can be used to identify the service grade(s) of the subscriber. The pairing key can be encrypted with proprietary technology, or can utilize public key infrastructure (PKI) technology. Alternatively, or in combination, the pairing key can comprise a personal identification number (PIN), user name and password, or other forms of secure verification technology. The pairing key can be programmed in the mobile device server 504, at 610. The programming step can occur while the mobile device server 504 is provisioned at a retail store of the service provider, over the air as by way of a cellular network, or over an Internet-capable wireline interface. For security purposes, the pairing key can be stored in a tamper-proof memory device such as a Subscriber Identity Module, commonly referred to as a SIM card. If portability of the pairing key is undesirable, the pairing key can be stored in a tamper-proof memory device integrated in the mobile device server 504. Other tamper-proof storage techniques can be used.

Method 700 depicts an illustrative embodiment for acquiring software applications and/or content offered by a content provider system 546 (shown in FIG. 5) by way of a mobile device server 504. The content provider managing the content provider system 546 and the service provider managing the service provider system referred to in method 600 can be the same entity, or can be an independent third party who has a commercial affiliation with the service provider of the systems in FIGS. 1-3.

At 702, the content provider system 546 may present an assortment of applications/content to a mobile device server 504 by way of, for example, an Internet browser operating from the mobile device server 504. A user of the mobile device server 504 can browse through software applications as well as media content and make one or more selections by way of the UI 404 of the mobile device server 404. Software applications in the present context can mean executable software that can operate under the control of the web server application 505 operating in the mobile device server 504. The executable software can represent any type of software that can perform functions of interest to the user of the mobile device server 504. For example, a software application can represent client software that can be used to control the media processor 506, or the gaming console 516 in building 502. Media content can represent audio content, visual content, or combinations thereof. When a selection is made in step 704, the content provider system 546 can be adapted to extract the selected software application and/or content from database 548 and download a copy to the mobile device server 504 with a pairing key in step 706 over a wireless or a wireline interface.

The pairing key of method 600 differs from the pairing key of method 700. Specifically, the pairing key referred to in method 700 can be used for authenticating the software application and/or media content, while the pairing key of method 600 can be used for authenticating the user of the mobile device server 504 and/or for defining grade(s) of services that a user of the mobile device server 504 has subscribed to. Both pairing keys can be generated by the service provider of the systems of FIGS. 1-3. The pairing key of method 700 can be utilized by the service provider to prevent unauthorized use of software applications and/or media content with any of the resources (e.g., media processor 506, gaming console 516, etc.) supplied to subscribers of the service provider.

When the software application and/or media content has been downloaded to the mobile device server 504, at 706, the billing system 542 of FIG. 5 can be adapted to identify, at 708, a subscriber account associated with the mobile device server 504 and identify, at 710, a service grade (or grades) from the information retrieved from the subscriber account. At 712, the billing system 542 can be further adapted to determine whether to apply a charge to the subscriber account according to the service grade(s). For example, the service provider can offer a service grade in which the subscriber can download unlimited software applications or media content without a charge. A different service grade may allow some types of software applications and/or media content to be downloaded free of charge, while for others the subscriber may be charged a fee. It is contemplated that the service provider of the systems of FIGS. 1-3 can define multiple service grades each with differing fee policies.

If at 712, the billing system 542 determines from the service grade that a charge is to be applied to the subscriber's account, then the billing system 542 proceeds to 714 where it applies a charge to the subscriber's account. In the embodiment illustrated in FIG. 7, if the content provider system 546 is managed by a third party having a commercial arrangement with the service provider, then the billing system 542 can also be adapted, at 716, to share a portion of the revenue from the charge applied to the subscriber account with the content provider. The present disclosure also contemplates the content provider and the service provider being the same entity.

It is contemplated that method 700 can be modified in numerous ways to accomplish the same or similar tasks. For instance, sharing a portion of the charges applied to subscriber accounts with the content provider can be implemented by other systems of FIGS. 1-3. For example, the content provider system 546 can be adapted to apply charges to a subscriber's account which in turn triggers systems of the service provider to submit an electronic payment to the content provider. The electronic payment can represent a portion of revenue from the charged subscriber fees in accordance with a commercial arrangement between the service provider and the content provider. It is further contemplated that in this arrangement the subscriber can be made to believe that the content provider and the service provider are one and the same since the subscriber only sees billing statements from the service provider with no indication that the content provider is a third party having a commercial arrangement with the service provider.

Methods 800-900 depict illustrative embodiments in which a mobile device server 504 acquires access to resources in the media resource center 530 of building 502.

Method 800 begins at 802 in which the mobile device server 504 of FIG. 5 executes a web server application 505. Step 802 can be initiated by a user manipulating the user interface of the mobile device server 504. Alternatively, the web server application 505 can be automatically initiated by other triggers such as time of day, a user profile, or combinations thereof. The web server application 505 in the mobile device server 504 can be operable to detect, at 804, a resource control manager 518 when roaming into a communication zone of the resource control manager 518. The communication range of the communication zone can be driven by the wireless service and technology characteristics of the gateway 508. Step 804 can represent the web server application 505 of the mobile device server 504 scanning for media resources in building 502 by way of gateway 508 providing access to a wireless network. The gateway 508 can be a WiFi router and modem combination which is communicatively coupled to the ISP network 510 by way of a wired interface such as a coaxial cable or telephone wire interface.

The web server application 505 of the mobile device server 504 can scan for the presence of media resources such as the media processor 506 by requesting information from the resource control manager 518. The resource control manager 518 can transmit to the mobile device server 504 a list of the active devices on the WiFi network. Alternatively, or in combination, the web server application 505 of the mobile device server 504 can transmit a broadcast message on the WiFi network requesting identification from the devices communicatively coupled to the WiFi network. Other identification techniques are contemplated by the present disclosure.

Once the resource control manager 518 has been discovered, the web server application 505 can present the detected media resource(s) to a user over the UI 404 of the mobile device server 504. The user can manipulate the UI 404 as previously described to indicate a desire to establish communications with the resource control manager 518. Alternatively, or in combination, a need to establish communications with the resource control manager 518 can be detected from a prior history of user interactions, a profile established by the user of the mobile device server 504 indicating a preference for establishing communications with the resource control manager 518, or other triggers that may be definable by user behavior or user-established settings.

In step 806, the web server application 505 in the mobile device server 504 can initiate a URL directed to the remote server 512 by way of the gateway 508. The following is an illustrative embodiment of a URL that can be initiated by the mobile device server 504: http://someServer.com/launchApp?special_app=http://<IP address of MDS x.x.x.x>/mrml.xml. The URL can include a domain name of the remote server 512 and instructions to launch a specific software application executable by the web server application 505 in the mobile device server 504. The URL can also include an IP address of the mobile device server 504 which can be used to launch the software application. In step 808, the gateway 508 can attach localization information in the form of header information into an IP header source for network address translation or an HTTP header prior to forwarding the URL to the remote server 512.

The server 512 can receive the URL message by way of the ISP network 510 of FIG. 5. The server 512 can in turn identify in step 810 from the HTTP header the IP address of the gateway 508. The server 512 can also identify from the URL message the software application to be invoked by the mobile device server 504 (e.g., special_app_to_enable-_comm_with_resource_ctrl_mgr), and the IP address associated with the software application which can be used to identify the software application and/or the mobile device server 504.

At 812, the remote server 512 can authenticate the request from the mobile device server 504 using the IP address of the mobile device server 504 or some other identifier added to the URL message (e.g., MAC address of the mobile device server 504). If the server 512 does not recognize the mobile device server 504 at 814, method 800 can cease. Otherwise, if authentication is successful, the server 512 can proceed to 816. Authentication of the mobile device server 504 can be delegated to the resource control manager 518, in which case the method 800 may bypass 812 and 814.

At 816, the server 512 can be operable to locate the resource control manager 518 and media resources managed thereby according to the detected IP address of the gateway 508. The server 512 can locate the resource control manager 518 from a look-up table in a database 514 operating, for example, as a Domain Name Server (DNS), a subscriber database, or combinations thereof. Once the resource control manager 518 and resources managed thereby have been identified, the server 512 can transmit to the resource control manager 518, at 818, a new URL message to invoke the software application in the mobile device server 504 according to the IP address of the mobile device server 504. The following is an illustrative embodiment of a URL message that can be transmitted to the resource control manager 518: http://<IP address of MDS x.x.x.x>/mrml.xml.

Once the resource control manager 518 invokes this URL at 820, the web server application 505 in the mobile device server 504 can be operable to execute the software application (special_app_to_enable_comm_with_resource_ctrl_mgr) at 822 to establish an initial state of communications with the resource control manager 518. Authentication of the mobile device server 504 can take place at 824-826 prior to enabling communication services between the mobile device server 504 and resources managed by the resource control manager 518. At 824, the mobile device server 504 can transmit authentication data to the resource control manager 518. The authentication data can comprise, for example, the pairing key programmed in the mobile device server 504 by the service provider at 610. As noted earlier, the pairing key can be encrypted data, a PKI key, a PIN, user name and password, or other forms of secure verification technology. The pairing key can be utilized to prevent mobile device servers 504 from utilizing media resources of the communication systems of FIGS. 1-3 unless authorized by the service provider of these systems.

If the authentication data is invalid or not recognized, method 800 ceases at 826 and may submit an error message to the user of the mobile device server 504 (e.g., "You are not authorized to pair your device with the media resources in this residence"). Otherwise, the resource control manager 518 proceeds to 902 of FIG. 9 where it identifies service grades from the pairing key. The resource control manager 518 can maintain a database of pairing keys and their corresponding service grade(s) from prior interactions, or can submit a request to a server of one of the communication systems of FIGS. 1-2 or FIG. 5 (such as server 512 or billing system 542) to request an identification of the service grade(s) assigned to the mobile device server 504 according to the supplied pairing key. The service grade(s) can identify the extent of services offered to the mobile device server 504, and the resources that can be made available to the mobile device server 504 in building 502.

Suppose, for example, that a service provider offered three service grades branded as Platinum, Gold and Bronze. Platinum services can, for example, include an offering that combines voice (e.g., VoIP or IMS), television services (e.g., IPTV), gaming services, and high-speed Internet services, and the resources from which they operate (e.g., computer 520, media processor 506, and gaming console 516) which can be made available to the mobile device server 504. Gold services can represent fewer services and resources than those offered in a Platinum plan, but more services and resources than those offered in a Bronze plan. The service provider can offer Platinum services at higher subscription fees than Gold services, while Gold services can be priced lower than Platinum services, but higher than Bronze services. The service provider of the communication systems of FIGS. 1-3 can utilize more complex service schemes by defining subservice levels of a particular service category. For example, Platinum services can have sublevel service grades for the media processor 506 (e.g., premium channels vs. basic channels), the gaming console 516 (e.g., unlimited access to games vs a limited subset of games with the option to purchase others in an on-demand model), and the computing device 520 (e.g., various levels of access to CPU resources, and memory storage). Multiple types of service grades can be defined by the service provider.

Once the service grade(s) have been identified, the resource control manager 518 can supply the pairing key to, for example, the billing system 542 and inform the billing system 542 that the mobile device sever 504 has requested certain resources of the media resource center 530. Based on the resources requested by the mobile device server 504 and the service grades associated with the mobile device server 504 (identifiable by the pairing key), the billing system 542 can be adapted to determine, at 904, whether to apply a charge for providing the mobile device server 504 with access to the requested resources. If the service grade(s) allow for free access to the resources in building 502 then 906 can be skipped. Otherwise, the billing system 542 can be adapted to apply a charge, at 906, to a subscriber account associated with the mobile device server 504 according to the resources requested by the mobile device server 504.

At 908, the mobile device server 504 can be adapted to provide the resource manager 518 with the pairing key of the software application and/or media content that the mobile device server 504 wants to utilize in association with the requested resources. For example, the mobile device server 504 may have a software application which may require the use of the gaming console 516 or the media processor 506. Alternatively, or in combination, suppose the mobile device server 504 would like to transfer or process media content (e.g., a movie downloaded from the content provider system 546) at the media processor 506. In both instances, the pairing key supplied to the resource control manager 518, at 908, can be used to authenticate the software application and/or the media content as being pre-screened and approved by the service provider.

The resource control manager 518 can have a history of pairing keys associated with software and/or content from prior interactions, or can contact the remote server 512 to determine if the pairing key supplied by the mobile device sever 504 is valid. The remote server 512 can have in its database 514 a copy of all the pairing keys supplied to the content provider system 546 in order to validate the use of a software application and/or media content with the media resource center 530 of building 502. If the remote server 512 validates the pairing key at 910, the resource control manager 518 can proceed to 912, otherwise it terminates interactions with the mobile device server 504. An error message can then be submitted to the user of the mobile device server 504 (e.g., "You are not authorized to use the software application XXX or media content YYY with the resources in this residence").

If the pairing key is valid, then the resource control manager 518 at step 912 selects one or more resources which can be utilized by the mobile device server 504 according to the service grade(s) assigned thereto. At 914, the resource control manager 518 can also delegate management of the selected resources to the mobile device server 504 based on the service grade(s). In this embodiment, the mobile device server 504 can be authorized to manage the selected resources without interference by the resource control manager 518. If delegation is appropriate, the resource control manager 518 can inform the mobile device server 504 at 916 that it is delegating management of the selected resources to the mobile device server 504.

To assist the mobile device server 504, the resource control manager 518 can transmit to the mobile device server 504, at 918, information associated with delegated resources to assist the mobile device server 504 in managing these resources. The information can include provisioning data, service provider and subscriber usage policies, telemetry data, and other suitable information for managing these resources. Provisioning data can represent an identification of services enabled and available for use by the mobile device server 504. Service provider usage policies can define how these resources can be used by the mobile device server 504 and other devices managed by the mobile device server 504.

For example, a service provider usage policy can identify digital rights management policies, Quality of Service policies, bandwidth management policies, and so on. Subscriber policies can represent subscriber usage preferences such as media content preferences, usage policies (time of day, blocked periods, parental controls, etc.), load management policies, and so on. Subscriber policies can be established through the web portal services described in FIG. 3. For example, a web page can be presented to a subscriber which identifies a list of customizable options to establish a resource management policy to be followed by the resource control manager 518 when enabling or delegating services to a mobile device server 504.

Referring back to 914, if delegation is not appropriate according to the service grade(s) of the subscriber, the resource control manager 518 can proceed to 920 where it determines if other mobile device servers 504 are present in the network established by the gateway 508. If only one mobile device server 504 is present, the resource control manager 518 can proceed to 922 where the resource control manager 518 assigns the selected resources to the mobile device server 504. At 924, the resource control manager 518 can transmit to the mobile device server 504 a usage policy summarizing the service provider and subscriber usage policies previously described. From this point forward, the mobile device server 504 can begin to utilize the resources assigned at 922.

Referring back to 920, if the resource control manager 518 detects that more than one mobile device server 504 is requesting the same resources, the resource control manager 518 can proceed to 926 where it can arbitrate between the detected mobile device servers 504. The arbitration process can prompt each user of the mobile device servers 504 to make concessions. Alternatively, or in addition to, the resource control manager 518 can resolve arbitration on the basis of which of the mobile device servers 504 has the highest service grade (or sublevels of service grades). It is contemplated that any arbitration technique can be applied at 926. Once arbitration has been completed, the resource control manager 518 can proceed to 928 where the resource control manager 518 assigns resources to each mobile device server 504 according to the arbitration results. The assignment can represent a distribution of resources with or without sharing of such resources between the mobile device servers 504. For example, some resources might be shared between multiple mobile device servers 504 (e.g., a media processor 506) while others are assigned exclusively to one of the mobile device servers 504 (e.g., gaming console 516). In step 930, the resource control manager 518 can transmit to each mobile device server 504 a usage policy as previously described for the arbitrated resources.

The present disclosure contemplates a mobile device server 504 that among other things can be programmed with a pairing key that can be used to identify grades of services to which a user of the mobile device server 504 has subscribed. Additional pairing keys can be used to enable a service provider to manage which applications and/or content a mobile device server 504 can be used with the resources of a media resource center 530. The mobile device server 504 can be adapted to detect media resources managed by the resource control manager 518 and can be further adapted to acquire access to all or a portion of such resources according to the illustrative embodiments of methods 800-900 of FIGS. 8-9. By making a web server application 505 portable by way of a mobile device server 504 as described above it may no longer be necessary for media resources to be managed solely by way of infrastructure devices such as those shown in FIGS. 1-3, which are generally not portable. As result, infrastructure resources can be preserved thereby reducing infrastructure costs.

Figure 10:
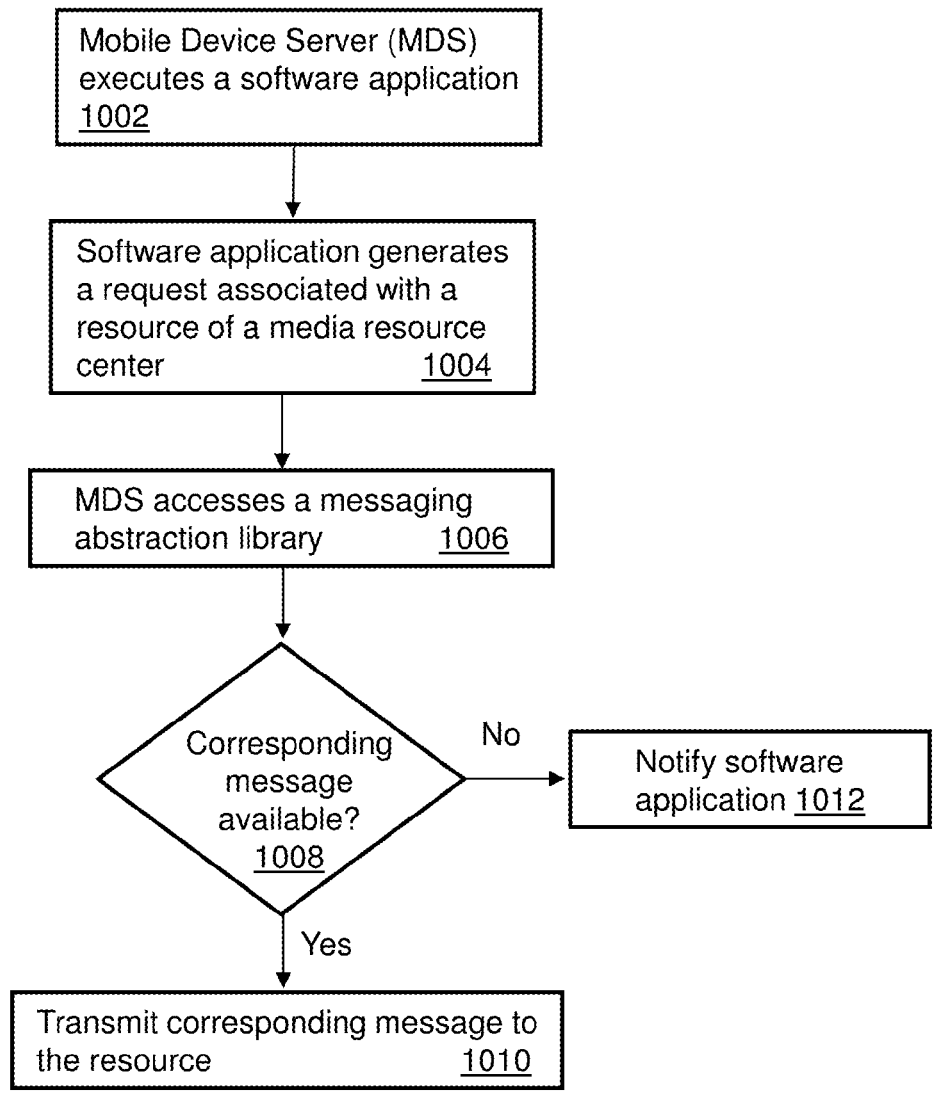

FIG. 10 depicts an illustrative embodiment of a method 1000 that can be applied to the operations of portions of the systems and devices of FIGS. 1-5. Method 1000 can be utilized with all or portions of methods 600-900. Method 1000 can begin at 1002, where a software application is being executed by the mobile device server 504. At 1004, the software application can generate a request that is associated with a resource of the media resource center 530. The request can be various forms of communication between the software application and the resource, including passive, inquisitive and/or directive communications. For example, the request can be a command generated by the software application to control presentation of media content by the media processor 506. As another example, the request can be a command generated by the software application to the gaming console 516 to allow for integration of graphics created by the software application (such as an avatar) with a video game being executed by the gaming console.

At 1006, the mobile device server 504 can access a messaging abstraction library 176 that includes messages associated with operation of the resource. In one embodiment, the messaging abstraction library 176 can be stored on a remote server, such as server 130 or server 512. In another embodiment, the messaging abstraction library 176 can be stored on the mobile device server 504. For instance, upon detection of a resource, a portion of the messaging abstraction library 176 that corresponds with the detected resource can be provided to the mobile device server 504 for storage in a memory of the mobile device server.

In one embodiment, access to the messaging abstraction library 176 can be based on a pairing key associated with one or more of the mobile device server 504, the resource, and the software application. For example, a pairing key of the mobile device server 504, which enables the software application to utilize the gaming console 516, can also be used by the mobile device server to access messages associated with that gaming console from the messaging abstraction library 176. In one embodiment, the pairing key can include or be associated with identification information for one or more of the software application, the resource and/or the mobile device server 504, such as a model number, software version and so forth. The identification information can then be utilized to facilitate retrieving the device specific message associated with the resource and/or the software application. In another embodiment, identification information of one or more of the software application, the resource and/or the mobile device server 504 can be retrieved from various sources, including remote sources, such as server 512.

The messaging abstraction library 176 can be associated with various types of resources that are used by the media resource center 530, such as media processor 506, gateway 508, gaming console 516 and/or computing device 520. Method 1000 can allow the messaging abstraction library 176 to be updated with messages, such as based on changes to the resources. For instance, when a new resource is being provided by a service provider, such as a new model of a set top box, the messaging abstraction library 176 can be updated with messages that correspond to operation of the new set top box. As another example, a modification to a communication protocol of an existing resource, such as a software update downloaded to a gaming console, can result in the messaging abstraction library 176 being updated with messages that correspond to operation of the gaming console based on the software update.

In one embodiment, method 1000 can allow updating of the messaging abstraction library 176 without modification of the software application of the mobile device server 504. For example, software developers who desire to modify the functionality of their software application so that it is applicable to a particular resource, such as a newly implemented resource of a service provider or an existing resource that has been modified (such as by software update or hardware adjustment), may do so by updating messages in the messaging abstraction library 176 without the need to provide a software update to each of the software applications being executed on mobile device servers 504.

If at 1008, a message is available in the messaging abstraction library 176 that corresponds with the request of the software application then, at 1010, the corresponding message can be transmitted to the resource. The messaging abstraction library 176 allows the mobile device server 504 to provide the resource with device specific instructions that are stored as messages in the messaging abstraction library, as opposed to generic instructions generated by the software application. The messaging abstraction library 176 facilitates the introduction of new components (i.e., resources) and the introduction of modifications to the operation of existing resources (e.g., software updates to the resources) by translating the software application requests to the device specific instructions. The device specific instructions can correspond to a communication protocol utilized by the resource.

If at 1008, the messaging abstraction library 176 does not have a message corresponding to, or otherwise representing, the request by the software application, notice can be provided to the software application at 1012. In one embodiment, the mobile device server 504 can transmit the request in its original form to the resource if there is no corresponding message. In another embodiment, notice can be provided to a system administrator or other entity so that a corresponding message can be generated and stored in the messaging abstraction library 176.

It should be further understood that method 1000 can be a bi-directional messaging process. Responses from the resource can be translated to messages that conform to the communication protocol of the software application. The retrieval of a message from the messaging abstraction library 176 that represents the response of the resource can be performed by the mobile device server 504 and/or by the resource. For instance, both the mobile device server 504 and the resource can have access to a remote server 512 that maintains the messaging abstraction library 176. In another embodiment, the messaging abstraction library 176 can be resident to one device and remote from another. For instance, the messaging abstraction library 176 can be downloaded in part from the remote server 512 to the mobile device server 504, while the resource communicates with the remote server 512 to access the messaging abstraction library. Method 1000 can utilize various encryption techniques for the signals being transmitted, including the request, the response and/or the messages.

In another embodiment, the remote server 512 can be utilized as a messaging intermediary that directly delivers the translated message to the resource or to the mobile device server 504 when the request or response is received from the other of the resource or the mobile device server.

Upon reviewing the aforementioned embodiments, it would be evident to an artisan with ordinary skill in the art that said embodiments can be modified, reduced, or enhanced without departing from the scope and spirit of the claims described below. For example, methods 800-900 can be adapted so that a mobile device server 504 can communicate with other mobile device servers 504. In this configuration, one of the mobile device servers 504 can function in part as the resource control manager 518 in a master-slave configuration. The mobile device server 504 operating as the resource control manager 518 can assign and/or delegate resources according to the service grade of the requesting mobile device server 504.

In one embodiment, FIG. 5 can be adapted so that the resource control manager 518 is located remotely from building 502. In another embodiment, the resource control manager 518 can be an integral part of remote server 512, or can operate from a computing device that is communicatively coupled to the remote server 512. In another embodiment, the resource control manager 518 can be adapted to offer the mobile device server 504 resources which are remote from a vicinity of building 502. The remote resources can be in one or more other buildings or distributed in the networks of FIGS. 1-3. The remote resources can include without limitation computing resources, storage resources, media processing resources, or other resources which can be made accessible to a mobile device server 504. In yet another embodiment, the resource control manager 518 can be adapted to communicate with other resource control managers 518 located in the networks of FIGS. 1-3 or other residential or commercial buildings remote from building 502. In this embodiment, a resource control manager 518 can request and/or exchange resources with other resource control managers 518 to expand the reach and access of resources made available to mobile device servers 514.

In yet another embodiment, the methods described herein can be adapted to apply a monetary charge to one or more subscriber accounts which may or may not be associated with the mobile device server 504. For example, a user of the mobile device server 504 may have a credit card account. The billing system 542 can be adapted to charge the credit card account of the user when purchasing software or media content as described in method 700 of FIG. 7, and/or when requesting resources of the media resource center 530. In another embodiment, the methods described herein can be adapted so that a monetary charge is applied to a subscriber account of the host or the subscriber of the media resource center 530 when resources of the media resource center 530 are made available to mobile device servers 504 entering the premises 502. Combinations of the aforementioned monetization models are also possible. Accordingly, the present disclosure contemplates multiple monetization models which can be applied by service provider(s) of the systems of FIGS. 1-3 and FIG. 5.

Figure 11:
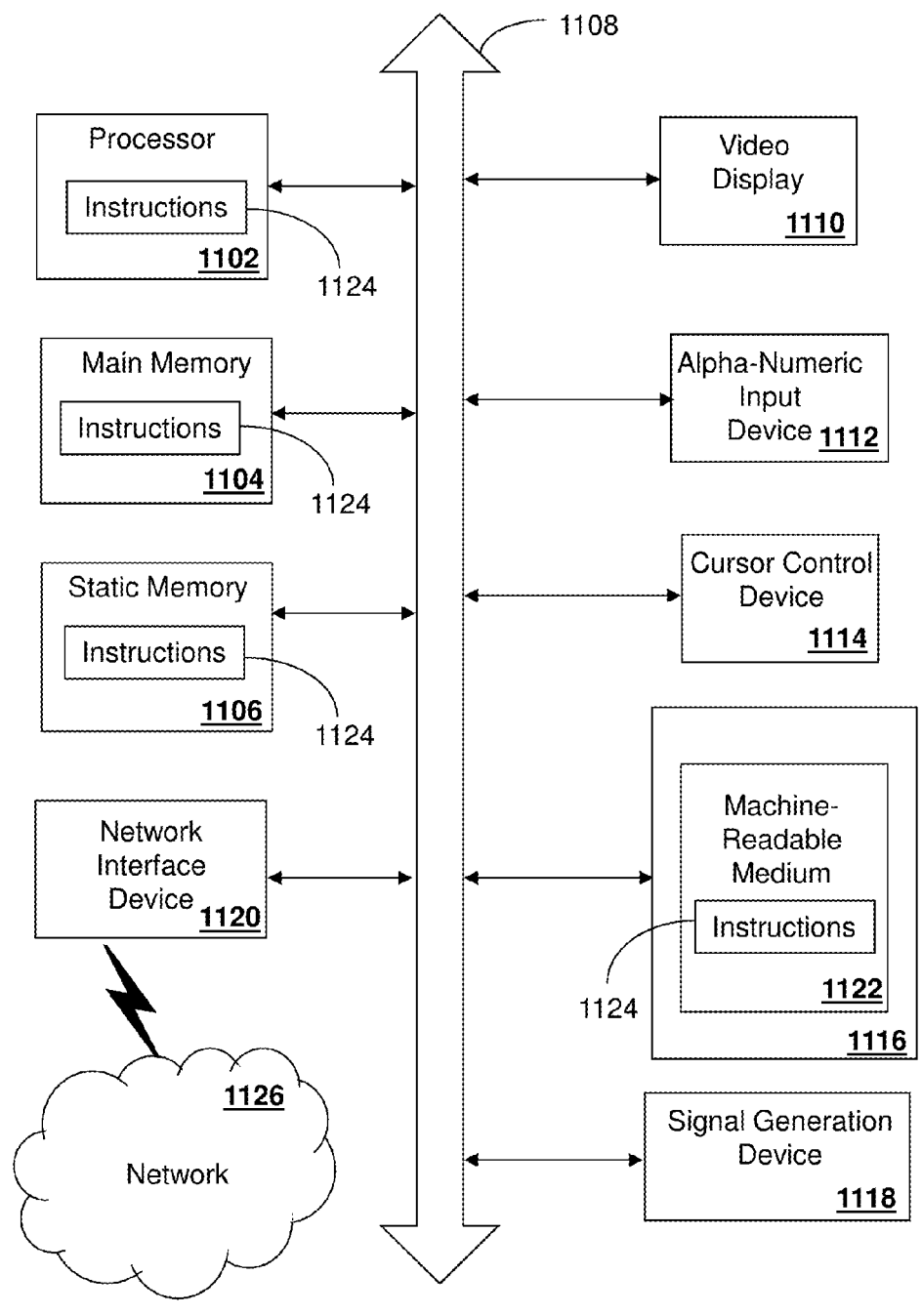
FIG. 11 is a diagrammatic representation of a machine in the form of a computer system within which a set of instructions, when executed, can cause the machine to perform any one or more of the methodologies discussed herein.

FIG. 11 depicts an exemplary diagrammatic representation of a machine in the form of a computer system 1100 within which a set of instructions, when executed, may cause the machine to perform any one or more of the methods discussed above. The machine can operate, for example, as the mobile device server 504, the media processor 506, the gateway 508, the remote server 512, the billing system 542, the content provider system 546, or combinations thereof as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a machine-readable medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1124, or that which receives and executes instructions 1124 so that a device connected to a network environment 1126 can send or receive voice, video or data, and to communicate over the network 1126 using the instructions 1124. The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, or encoding a set of instructions for execution by the machine and that cause the machine to perform any one or more of the methods of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A portable communication device, comprising:
a processing system including a processor; and
a memory that stores executable instructions that, when executed by the processing system, facilitate performance of operations, comprising:
receiving a pairing key;
detecting a media resource center upon entering a communication zone of the media resource center;
engaging in communication with a resource control manager of the media resource center, wherein the resource control manager manages utilization of a plurality of media resources of the media resource center;
transmitting the pairing key to the resource control manager to be authorized to manage utilization of the plurality of media resources;
detecting a request from a resident software application to utilize a media resource of the plurality of media resources;
receiving authorization to manage utilization of the plurality of media resources from the resource control manager wherein the authorization is responsive to the resource control manager identifying a highest service grade associated with the portable communication device, wherein the resource control manager engages in communication with a plurality of portable communication devices, wherein the plurality of portable communication devices includes the portable communication device, wherein each of the plurality of portable communication devices is associated with a service grade resulting in a plurality of services grades, wherein the plurality of service grades includes the highest service grade, wherein the resource control manager arbitrating delegation of management of the plurality of media resources to one of the plurality of portable communication devices comprises identifying of the highest service grade associated with the portable communication device;
accessing a messaging abstraction library to translate the request by identifying a message of a plurality of messages provided within the messaging abstraction library representative of the request and that conforms to a device specific command of the media resource of the plurality of media resources, wherein the plurality of messages comprise a plurality of communication protocols associated with the plurality of media resources;
accessing media content through a media content viewing application by providing the message including a protocol of the plurality of communication protocols for the device specific command of the media resource to the media resource, wherein the resource control manager authenticates the media viewing application according to the pairing key;
obtaining the media content, wherein the resource control manager provides the media content;
determining that the accessing of the media content through the media content viewing application is not part of a subscribed service provided by a service provider according to the highest service grade and the pairing key; and
billing a user associated with the media viewing application according to the highest service grade and the pairing key.

2. The portable communication device of claim 1, wherein the operations further comprise receiving a list of customizable options to establish a resource management policy regarding the utilization of the plurality of media resources implemented by the resource control manager.

3. The portable communication device of claim 1, wherein the operations further comprise providing a plurality of selected customizable options to establish a resource management policy to the resource control manager, and wherein the messaging abstraction library is updated with changes to the protocol without updating the resident software application that generated the request.

4. The portable communication device of claim 1, wherein the operations further comprise receiving information associated with the plurality of media resources wherein the information comprises provisioning data, service provider usage policy, subscriber usage policy, or telemetry data.

5. The portable communication device of claim 4, wherein provisioning data comprises an identification of services available for use by the portable communication device.

6. The portable communication device of claim 5, wherein the service provider usage policy comprises digital rights management policies, Quality of Service policies or bandwidth management policies.

7. The portable communication device of claim 6, wherein the subscriber usage policy comprises subscriber usage preferences, media content preferences, time of day usage, parental control, or a load management policy.

8. The portable communication device of claim 1, wherein the receiving the authorization to manage utilization of the plurality of media resources from the resource control manager further comprise receiving a plurality of selections for media content from a content provider system.

9. The portable communication device of claim 8, wherein the receiving the authorization to manage utilization of the plurality of media resources from the resource control manager further comprise providing selected media content from the plurality of selections for media content.

10. The portable communication device of claim 9, wherein the operations further comprise receiving authorization from the resource control manager to access the selected media content wherein the resource control manager determines that the portable communication device has authorization to access the selected media content based on the highest service grade.

11. A method, comprising:

communicating, by a processing system including a processor, with a resource control manager of a media resource center, wherein the resource control manager manages utilization of a plurality of media resources of the media resource center responsive to entering a communication zone of the resource control manager;

providing, by the processing system, a pairing key to the resource control manager to be authorized to manage utilization of the plurality of media resources;

receiving, by the processing system, authorization to manage utilization of the plurality of media resources from the resource control manager wherein the authorization is responsive to the resource control manager identifying a highest service grade associated with the processing system, wherein the resource control manager engages in communication with a plurality of processing systems, wherein the plurality of processing systems includes the processing system, wherein each of the plurality of processing systems is associated with a service grade resulting in a plurality of services grades, wherein the plurality of service grades includes the highest service grade, wherein the resource control manager arbitrating delegation of management of the plurality of media resources to one of the plurality of processing systems comprises identifying of the highest service grade associated with the processing system;

accessing, by the processing system, responsive to receiving a request to utilize a media resource of the plurality of media resources, a messaging abstraction library to translate the request by identifying a message of a plurality of messages provided within the messaging abstraction library representative of the request and that conforms to a device specific command of the media resource of the plurality of media resources, wherein the plurality of messages comprise a plurality of communication protocols associated with the plurality of media resources;

accessing, by the processing system, media content through a media content viewing application by providing the message including the device specific command to the media resource, wherein the resource control manager authenticates the media viewing application according to the pairing key;

obtaining, by the processing system, the media content, wherein the resource control manager provides the media content;

determining, by the processing system, that the accessing of the media content through the media content viewing application is not part of a subscribed service provided by a service provider according to the highest service grade and the pairing key; and billing, by the processing system, a user associated with the media viewing application according to the highest service grade and the pairing key.

12. The method of claim 11, further comprising:

presenting, by the processing system, a list of customizable options at a display device to establish a resource management policy regarding the utilization of the plurality of media resources implemented by the resource control manager.

13. The method of claim 12, further comprising providing, by the processing system, a plurality of selected customizable options to establish the resource management policy to the resource control manager.

14. The method of claim 13, further comprising receiving, by the processing system, information associated with the plurality of media resources wherein the information comprises provisioning data, service provider usage policy, subscriber usage policy, or telemetry data.

15. The method of claim 11, wherein the receiving, by the processing system, the authorization to manage utilization of the plurality of media resources from the resource control manager further comprise providing, by the processing system, selected media content from a plurality of selections for media content received from a content provider system.

16. The method of claim 15, further receiving authorization from the resource control manager to access the selected media content wherein the resource control manager determines that the processing system has authorization to access the selected media content based on the highest service grade.

17. A non-transitory, machine-readable storage medium, comprising executable instructions that, when executed by a processing system including a processor, facilitate performance of operations, comprising:

detecting a resource control manager center upon entering a communication zone of the resource control manager center;

engaging in communication with a resource control manager of a media resource center, wherein the resource control manager manages utilization of a plurality of media resources of the media resource center;

providing a pairing key to the resource control manager to be authorized to manage utilization of the plurality of media resources;

accessing media content from the plurality of media resources responsive to receipt of authorization to manage utilization of the plurality of media resources from the resource control manager wherein the authorization is responsive to the resource control manager identifying a highest service grade associated with the processing system, wherein the resource control manager engages in communication with a plurality of processing systems, wherein the plurality of processing systems includes the processing system, wherein each of the plurality of processing systems is associated with a service grade resulting in a plurality of services grades, wherein the plurality of service grades includes the highest service grade, wherein the resource control manager arbitrating delegation of management of the plurality of media resources to one of the plurality of processing systems comprises identifying of the highest service grade associated with the processing system;

accessing, responsive to receiving a request receive the media content as requested media content, a messaging abstraction library to translate the request by identifying a message of a plurality of messages provided within the messaging abstraction library representative of the request and that conforms to a device specific command of the media resource of the plurality of media resources, wherein the plurality of messages comprise a plurality of communication protocols associated with the plurality of media resources;

accessing the requested media content through a media content viewing application by providing the message including a protocol of the plurality of communication protocols for the device specific command of the media resource to the media resource, wherein the resource control manager authenticates the media viewing application according to the pairing key;

obtaining the requested media content, wherein the resource control manager provides the requested media content;

determining that the accessing of the requested media content through the media content viewing application is not part of a subscribed service provided by a service provider according to the highest service grade and the pairing key; and billing a user associated with the media viewing application according to the highest service grade and the pairing key.

18. The non-transitory, machine-readable storage medium of claim 17, wherein the operations further comprise providing a plurality of selected customizable options to establish a resource management policy to the resource control manager responsive to receiving a list of customizable options.

19. The non-transitory, machine-readable storage medium of claim 17, wherein the accessing of the requested media content further comprise transmitting selected media content from a plurality of selections for the requested media content received from a content provider system, and wherein the messaging abstraction library is updated with changes to the protocol without updating a resident software application that generated the request.

20. The non-transitory, machine-readable storage medium of claim 19, wherein the operations further comprise receiving authorization from the resource control manager to access the selected media content wherein the resource control manager determines that the processing system has authorization to access the selected media content based on the highest service grade.

* * * * *